US010694148B1

(12) United States Patent
Li et al.

(10) Patent No.: US 10,694,148 B1
(45) Date of Patent: Jun. 23, 2020

(54) IMAGE-BASED NAVIGATION USING QUALITY-ASSURED LINE-OF-SIGHT MEASUREMENTS

(71) Applicant: The Boeing Company, Chicago, IL (US)

(72) Inventors: Rongsheng Li, Corona, CA (US); Tung-Ching Tsao, Torrance, CA (US); Amir Leon Liaghati, Huntsville, AL (US); Shanshin Chen, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/453,600

(22) Filed: Jun. 26, 2019

Related U.S. Application Data

(60) Provisional application No. 62/847,283, filed on May 13, 2019.

(51) Int. Cl.
*H04N 7/18* (2006.01)
(52) U.S. Cl.
CPC .................................... *H04N 7/18* (2013.01)
(58) Field of Classification Search
CPC . G04F 5/14; G01S 19/02; G01S 19/20; G01S 19/40; G01S 19/235; G01S 19/42; H03L 7/087; H03L 7/0991; H04L 27/00; H04N 7/18
USPC .......................... 348/159, 161, 143, 148, 149
See application file for complete search history.

(56) References Cited

U.S. PATENT DOCUMENTS

| | | |
|---|---|---|
| 5,809,171 A | 9/1998 | Neff et al. |
| 6,691,947 B2 | 2/2004 | La Fata |
| 6,711,293 B1 | 3/2004 | Lowe |
| 6,863,244 B2 | 3/2005 | Fowell et al. |
| 7,487,016 B2 | 2/2009 | Fowell et al. |
| 7,751,651 B2 | 7/2010 | Oldroyd |
| 8,259,012 B2 | 9/2012 | Li et al. |
| 8,447,116 B2 | 5/2013 | Ma et al. |
| 8,509,965 B2 | 8/2013 | Lin |
| 8,666,661 B2 | 3/2014 | Higgins |
| 9,031,782 B1 | 5/2015 | Lemay et al. |
| 9,135,510 B2 | 9/2015 | Peynot et al. |

(Continued)

*Primary Examiner* — Robert Chevalier
(74) *Attorney, Agent, or Firm* — Ostrager Chong Flaherty & Broitman P.C.

(57) ABSTRACT

Systems and methods for providing improved navigation performance in which camera images are matched (using correlation) against reference images available from a geo-location-tagged database. An image-based navigation system partitions the camera image (corresponding to the area within the field-of-view of the camera) into a plurality of camera sub-images (corresponding to regions in that area), and then further partitions each camera sub-image into a multiplicity of tiles (corresponding to sub-regions within a region). The partitioning into camera sub-images seeks geometric diversity in the landscape. Each tile is checked for quality assurance, including feature richness, before correlation is attempted. The correlation results are further quality-checked/controlled before the results are used by the Kalman filter to generate corrections for use by the inertial navigation system. Respective lines-of-sight to multiple regions are measured using multiple tiles in each region to provide better observability and better performance.

20 Claims, 5 Drawing Sheets

(56) References Cited

U.S. PATENT DOCUMENTS

| | | | |
|---|---|---|---|
| 9,478,141 | B2 | 10/2016 | Revell et al. |
| 9,513,129 | B2 | 12/2016 | Wang |
| 10,054,445 | B2 | 8/2018 | Ma |
| 2001/0019636 | A1* | 9/2001 | Slatter .................. G06K 9/20 382/284 |
| 2009/0238460 | A1 | 9/2009 | Funayama et al. |
| 2017/0023365 | A1* | 1/2017 | Hunter, Jr. ............... G06T 7/74 |
| 2018/0052472 | A1* | 2/2018 | Cherepinsky ........ G08G 5/0039 |
| 2018/0112985 | A1 | 4/2018 | Madison |
| 2018/0164124 | A1 | 6/2018 | Viswanathan et al. |

* cited by examiner

IMAGE-BASED NAVIGATION USING QUALITY-ASSURED LINE-OF-SIGHT MEASUREMENTS

RELATED PATENT APPLICATION

This application claims the benefit, under Title 35, United States Code, 119(e), of U.S. Provisional Application No. 62/847,283 filed on May 13, 2019.

BACKGROUND

The present disclosure relates to systems and methods for image-based (also known as "vision-aided") navigation and more particularly relates to image-based navigation.

A global navigation satellite system (GNSS) can be used to provide navigation information, e.g., position and velocity measurements, for a mobile platform such as a vehicle. When the mobile platform is in a GNSS-denied environment, an inertial navigation system can be used to provide position, attitude and velocity measurements or estimates. However, in a typical inertial navigation system, the errors in estimated position increase with time.

In view of the challenges presented by GNSS-based and inertial navigation, some vehicles use methods of navigation that estimate spatial position based on visual indicators. Image-based navigation uses the angular measurements of reference points on the Earth's surface to determine vehicle attitude, vehicle position and time. Spatial position may be estimated, for example, by comparing captured images to images stored in a database.

A typical image-based navigation system includes a monocular camera and an image processor that is configured to match an acquired image to a reference image. Such image matching can be used, for example, to determine the position of a camera-equipped vehicle relative to the Earth-centered Earth-fixed (ECEF) coordinate system. The locations of matched images can be fed to a Kalman filter along with the position, velocity, and attitude calculated by the inertial navigation system. The Kalman filter fuses information from the inertial and image-based navigation systems to generate optimal estimates of the state of the vehicle.

One challenge posed by image-based navigation occurs when a vehicle travels over information-poor topography (e.g., water or desert). When part of the captured image contains insufficient information for matching, the quality of the overall measurement may be degraded.

SUMMARY

The subject matter disclosed in some detail below is directed to systems and methods for providing improved navigation performance in which camera images are matched (using correlation) against reference images available from a geolocation-tagged (also known as "geolocation-registered") database. In accordance with some embodiments, an image-based navigation system partitions the camera image (corresponding to the area within the field-of-view of the camera) into a plurality of camera sub-images (typically called "regions", corresponding to regions in that area), and then further partitions each camera sub-image into a multiplicity of smaller images, typically called "tiles" (corresponding to sub-regions within a region). The partitioning into camera sub-images seeks: (1) geometric diversity in the landscape; (2) opportunities to using different "weights" for different part of the images; and (3) reduction of computational burden. Each tile is checked for quality assurance, including feature richness, before correlation is attempted. The correlation results for the tiles are further quality-checked/controlled before the results are combined into the results for the regions, which are again, quality checked/controlled before they are used by the Kalman filter to generate corrections for use by an inertial navigation system. Respective line-of-sight measurements formed from the image correlation results to multiple regions are used to provide better observability and better performance.

As used herein, the term "camera" includes any device that can capture an image, such as a visible light camera, an infrared camera, a radar imager, a LIDAR imager, etc. Also more than one camera may be used in the manner disclosed herein to enhance performance of the navigation system.

In accordance with one embodiment, the method proposed herein has the following innovative features: (1) pre-correlation selection of good-quality tiles; (2) selection of tiles based on information richness (one example is to use one-dimensional entropy as a criterion) and geometric diversity; (3) post-correlation quality control; and (4) use of LOS measurements by the Kalman filter to provide better performance.

Although various embodiments of systems and methods for providing improved navigation performance will be described in some detail below, one or more of those embodiments may be characterized by one or more of the following aspects.

One aspect of the subject matter disclosed in detail below is a method for navigating a vehicle comprising: (a) converting light from an area within a field-of-view of a camera into camera image data representing pixel values of an image of the area; (b) partitioning the camera image data into a plurality of sets of camera sub-image data respectively representing pixel values of images of respective regions in the area; (c) partitioning a first set of camera sub-image data of the plurality of sets of camera sub-image data into a first multiplicity of sets of tile data representing pixel values of a first multiplicity of tiles respectively corresponding to a first multiplicity of sub-regions in a first region of the area; (d) identifying feature-rich tiles of the first multiplicity of tiles that have tile data evidencing a feature richness greater than a feature richness threshold; (e) for each feature-rich tile identified in step (d), calculating a respective two-dimensional array of correlation results indicative of degrees of correlation of the tile data with respective subsets of reference image data when the tile data has respective offsets, wherein the reference image data represents pixel values of a reference image representing a predicted scene; (f) for each feature-rich tile identified in step (d), assuring that a quality of the correlation results is greater than a quality assurance threshold; (g) calculating a first line-of-sight from the camera to a point in the first region by averaging lines-of-sight to respective points in the respective sub-regions corresponding to feature-rich tiles which were quality assured in step (f); (h) calculating position, velocity, attitude, and sensor error correction parameters for the vehicle based at least in part on the first line-of-sight for the first region calculated in step (g); and (i) determining a navigation solution which is based on at least the position correction calculated in step (h).

In accordance with various embodiments, the method described in the immediately preceding paragraph includes one or more of the following features. (1) The feature richness threshold is a threshold entropy value and step (d) comprises: calculating a respective entropy value for each tile of the first multiplicity of tiles; and comparing the respective entropy values to the threshold entropy value. (2) Step (f) comprises assuring that a distance separating first and second peaks in the correlation results is greater than a specified separation distance. (3) The method further comprises: (j) calculating a position, an attitude and a velocity of the vehicle based on inertial measurement data acquired by an inertial navigation system; (k) calculating an orientation of the camera relative to the body of the vehicle; and (l) selecting the reference image from a reference image database based on calculation results of steps (j) and (k).

In accordance with one embodiment, the above-described method further comprises: (j) partitioning a second set of camera sub-image data of the plurality of sets of camera sub-image data into a second multiplicity of sets of tile data representing pixel values of a second multiplicity of tiles respectively corresponding to a second multiplicity of sub-regions in a second region of the area; (k) identifying feature-rich tiles of the second multiplicity of tiles that have tile data evidencing a feature richness greater than the feature richness threshold; (l) for each feature-rich tile identified in step (k), calculating a respective two-dimensional array of correlation results indicative of degrees of correlation of the tile data with respective subsets of reference image data when the tile data has respective offsets relative to the reference image data; (m) for each feature-rich tile identified in step (k), assuring that a quality of the correlation results is greater than the quality assurance threshold; and (n) calculating a second line-of-sight from the camera to a point in the second region based at least in part on lines-of-sight to respective points in the respective sub-regions corresponding to the feature-rich tiles which were quality assured in step (m). In this embodiment, step (h) comprises calculating the position correction based on at least on an average of a plurality of lines-of-sight that includes at least the first and second lines-of-sight.

Another aspect of the subject matter disclosed in detail below is a method for navigating a vehicle comprising: (a) calculating a position, an attitude and a velocity of the vehicle based on inertial measurement data acquired by an inertial navigation system; (b) calculating an orientation of a camera relative to the body of the vehicle; (c) selecting a reference image representing a predicted scene from a reference image database based on calculation results of steps (a) and (b); (d) converting light from an area within a field-of-view of the camera into camera image data representing pixel values of an image of the area; (e) selecting from the camera image data a multiplicity of sets of tile data representing pixel values of a multiplicity of tiles respectively corresponding to a multiplicity of sub-regions in a region within the area; (f) identifying feature-rich tiles of the multiplicity of tiles that have tile data evidencing a feature richness greater than a feature richness threshold; (g) for each feature-rich tile identified in step (f), calculating a respective two-dimensional array of correlation results indicative of degrees of correlation of the tile data with respective subsets of reference image data representing pixel values of the reference image when the tile data has respective offsets relative to the reference image data; (h) calculating a line-of-sight from the camera to a point in the region based on the correlation results calculated in step (g); (i) calculating a position correction for the vehicle based on at least the line-of-sight calculated in step (h); (j) sending the position correction to the inertial navigation system; and (k) calculating a navigation solution based on at least the position correction calculated in step (i). Steps (e) through (h) are performed for each region of a plurality of regions within the area, wherein the position correction is calculated based on an average of a plurality of lines-of-sight respectively calculated for the plurality of regions.

A further aspect of the subject matter disclosed in detail below is a system for navigating a vehicle comprising: an inertial navigation system configured to generate a navigation solution; a guidance and control system communicatively coupled to the inertial navigation system and configured to control the vehicle in accordance with the navigation solution; a time-matching buffer communicatively coupled to the inertial navigation system and configured to store data representing position, velocity and attitude of the vehicle with a time-tag; a camera system comprising a camera and a camera abstraction module configured to convert light from an area within a field-of-view of the camera into camera image data representing pixel values of an image of the area; a camera output predictor communicatively coupled to receive time-tagged position, velocity, and attitude of the vehicle from the time-matching buffer and retrieve reference image data representing pixel values of an image of a predicted scene from a reference image database; an image correlation module communicatively coupled to receive the camera image data and the reference image data and configured to partition the camera image data into respective sets of camera sub-image data corresponding to respective regions in an area within a field-of-view of the camera, partition each set of the camera sub-image data into respective sets of tile data corresponding to respective sub-regions in a respective region and then generate correlation results representing degrees of correlation between the respective sets of tile data and the reference image data; a line-of-sight calculation module communicatively coupled to receive the correlation results from the image correlation module and configured to calculate respective lines-of-sight for each region based on the correlation results; and a Kalman filter communicatively coupled to the line-of-sight calculation module to receive the calculated lines-of-sight for the regions and configured to generate a position correction based on the received lines-of-sight and then send the position correction to the inertial navigation system.

In accordance with some embodiments of the system described in the immediately preceding paragraph, the image correlation module is further configured to perform operations comprising: (a) selecting from the camera image data a multiplicity of sets of tile data representing pixel values of a multiplicity of tiles respectively corresponding to a multiplicity of tiles in each region within the area; (b) identifying feature-rich tiles of the multiplicity of tiles that have tile data evidencing a feature richness greater than a feature richness threshold; and (c) for each feature-rich tile identified in operation (c), calculating a respective two-dimensional array of correlation results indicative of degrees of correlation of the tile data with respective subsets of reference image data representing pixel values of the reference image when the tile data has respective offsets relative to the reference image data.

Other aspects of systems and methods for providing improved navigation performance are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
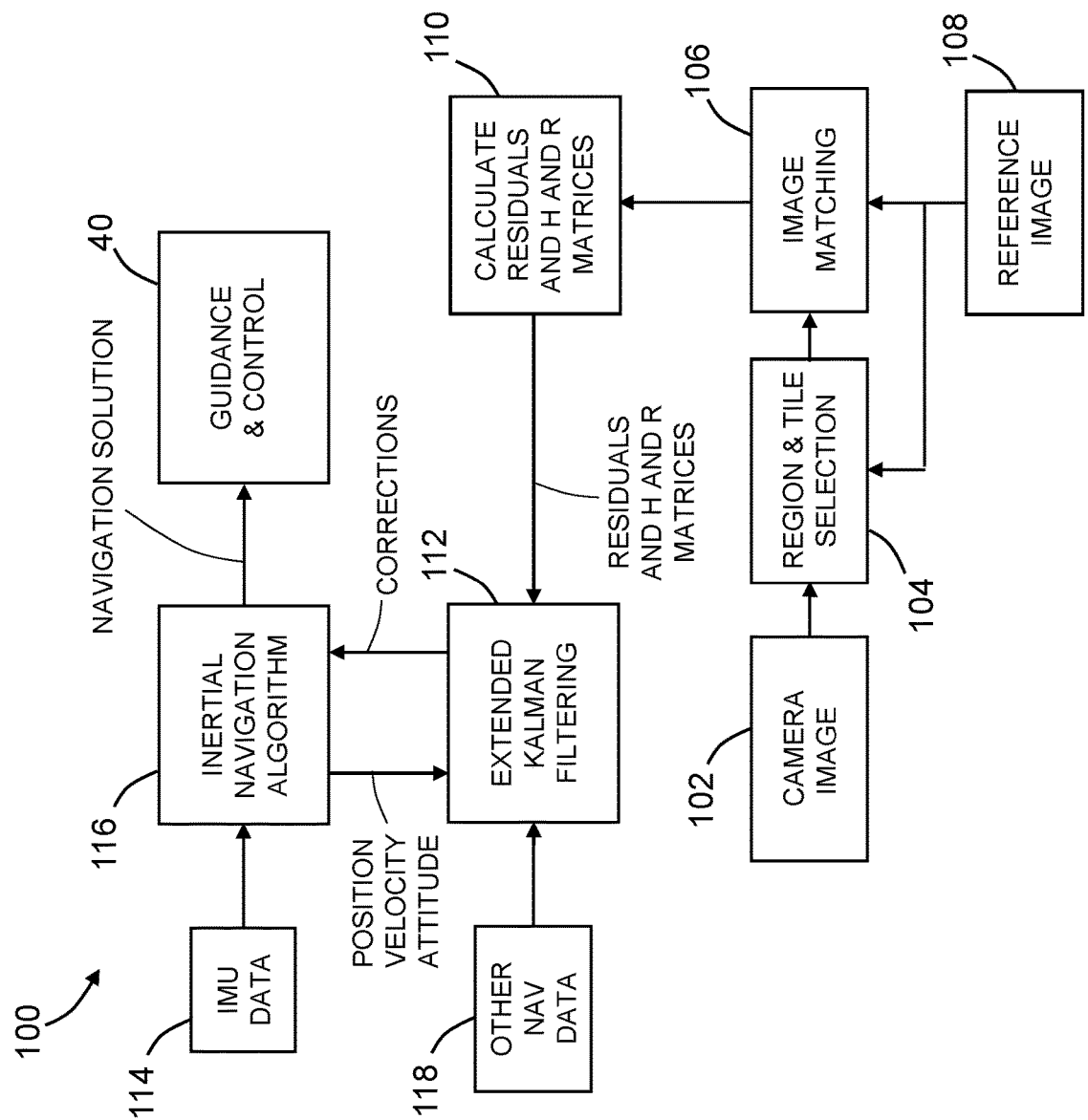
FIG. 1 is a flowchart identifying steps of a method that uses image-based navigation to augment inertial navigation.

Illustrative embodiments of systems and methods for providing improved navigation performance are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A typical image-based navigation system uses a camera to capture a series of images (frames) and estimate current position and/or orientation from an earlier position and/or orientation by tracking apparent movement of features within the series of images. Image features that may be tracked include points, lines or other shapes within the image that are distinguishable from the local background by some visual attribute, such as brightness or color provided that features are fixed in position and have a constant visual attribute during image capture.

Vision-aided inertial navigation systems combine the use of an image-based navigation system with inertial measurements to obtain an augmented navigation solution. Integrating an inertial measurement unit (IMU) and a camera in a navigation system can provide satisfactory performance in GNSS-denied environments or can improve upon the accuracy of GNSS-based navigation. For example, during flight over visual feature-rich areas, various landmarks can be matched to corresponding features represented by digital data extracted from an existing map database. A navigation solution, combining the position, velocity and attitude information from the inertial navigation systems with image-based corrections, can be calculated and then input into a flight controller to guide the vehicle to a target position. However, when a vehicle flies over any area lacking matchable features for an interval of time, the image-based navigation system may determine an untrue geographic position, thereby decreasing the accuracy of the navigation solution.

The image correlation method and apparatus proposed herein compares a tile (image of a sub-region) selected from a camera image (image of an area comprising regions with sub-regions) to a reference image representing a predicted scene having known coordinates in the ECEF frame of reference. The geo-tagged reference image is used as a template over which the tile will be scanned as the apparatus searches for a match between the selected tile and the reference image. Contiguous reference images may form a map of a portion of the Earth's surface. For example, reference images may be generated using reconnaissance photographs of an area of interest. The photograph can then be digitally scanned to create a reference image formed of a number of pixels. Each pixel is representative of a predetermined gray level, typically designated 0 to 255. The pixel values of the reference images are stored as digital data in a non-transitory tangible computer-readable storage medium, such as a random access memory device. The image correlation method and module proposed herein compares the histogram of the plurality of pixels which form the reference image to the histogram of a portion of a camera image (hereinafter "tile") captured during flight of a vehicle. The camera image (and any tile selected therefrom) is also formed of a plurality of pixels representative of predetermined gray levels.

FIG. 1 is a flowchart identifying steps of a method 100 for enabling computer-implemented vision-aided inertial navigation for determining navigation solutions for a vehicle. All of the image data processing steps of method 100 may be performed by respective modules configured to provide the below-described functionalities. Each module may include one or more processors programmed to execute instructions in accordance with respective software programs.

The image-based navigation system includes an onboard image sensor (e.g., a camera) that produces a time sequence of camera images 102 of an area of the Earth's surface situated within the field-of-view of the image sensor. Concurrently with operation of the image-based navigation system, an onboard inertial measurement unit (IMU) generates a time sequence of inertial navigation information 114 (hereinafter "IMU data 114"). An inertial navigation algorithm 116 (performed in an inertial navigation solution module) is configured to analyze the IMU data 114 to produce a time sequence of estimated inertial navigation solutions representing changing locations of the vehicle. That navigation solution is computed based in part on corrections derived by comparing the position determined by the image-based navigation system to the position determined by the inertial navigation system. The respective data from the inertial navigation system and the image-based navigation system are fused by an extended Kalman filter (EKF). The resulting navigation solution thus takes into account the corrections.

In accordance with the embodiment depicted in FIG. 1, an extended Kalman filtering process 112 (performed by an extended Kalman filtering module) is used to fuse navigation data from the image-based navigation system with navigation data from the inertial navigation system (position, velocity and attitude of the vehicle) and send corrections to the inertial navigation algorithm 116. These corrections can be applied by the inertial navigation algorithm 116 to determine the navigation solution (e.g., position, velocity, and attitude of the vehicle). In accordance with one exemplary application, the navigation solution is used by the guidance and control system 40 (e.g., a flight controller or autopilot in the case where the vehicle is an aircraft) to control movement of the vehicle.

In one proposed implementation, the image sensor is a monocular camera. An image sensor in the form of a video camera may be dynamically aimed relative to the vehicle to scan the ground. The image sensor has an optical axis, the direction of which depends on the attitude of the image sensor. Successive frames of image data (e.g., camera images 102 in FIG. 1) are captured by the image sensor. Each camera image 102 is a two-dimensional set of pixel values. A subset of those pixel values, representing a portion of the camera image 102, is selected using a region and tile selection process 104. (Region and tile selection process 104 is performed by an image correlation module.)

The pixel values of each selected tile are then quantized and categorized to generate a histogram using an image matching process 106 (performed by the image correlation module). As part of the image matching process 106, the probabilities of the pixel values are computed. The probability of a pixel value in a camera image is equal to the population within the corresponding bin of the histogram divided by the total number of pixels. The histogram of the selected tile is subsequently correlated with respective histograms of respective portions (sub-images) of a reference image 108 using respective offsets of the tile relative to the reference image. The reference image 108 represents a scene of a portion of the Earth's surface having known geographic coordinates. During the image matching process 106, a respective correlation score is generated for each offset tile position. In accordance with one proposed implementation, the reference image 108 represents the image of the geographic area beneath a predicted position of the vehicle, which predicted position is acquired using an inertial navigation algorithm 116. During the image matching process 106, a search is performed during which the selected tile is scanned pixel by pixel over the reference image in both the row-wise and column-wise directions and then the reference sub-image that best matches the selected tile is found (based on correlation scoring).

After a reference sub-image that best matches the selected tile has been found, the image correlation module estimates the current location of the camera in the ECEF frame of reference. Based on line-of-sight measurements, residuals, a sensitivity matrix (H-matrix) and a measurement error matrix (R-matrix) are calculated (step 110) and then input to an extended Kalman filtering process 112, An extended Kalman filter is used to fuse the camera-based motion estimate with the IMU-based position, velocity and attitude measurements to generate navigation corrections. Optionally, the extended Kalman filtering process 112 may take into account navigation data 118 derived from other sources (e.g., satellites) when computing the navigation corrections. The navigation corrections are then sent to the inertial navigation algorithm 116, which uses those corrections to generate a navigation solution. In one proposed application, the navigation solution is used by the guidance and control system 40 to control movement of the vehicle.

As part of the tile selection process 104 identified in FIG. 1, the camera image 102 is initially partitioned into camera sub-images and then a respective set of tiles are selected from each camera sub-image. Each tile is formed by a two-dimensional array of pixel values representing a respective portion of the camera image 102. More specifically, the pixel values are relative gray levels of the pixels in the selected tile. The histogram of the pixel values of the selected tile will be compared to the histogram of pixel values of the reference image 108. As will be explained in some detail later, a particular tile is extracted from the camera image 102 based on feature richness or expected correlation results.

As previously mentioned, the image matching process 106 determines the number of pixels in the camera image 102 which are representative of each of the predetermined gray levels, organizes that information to generate a histogram, and then computes the probabilities of those pixel values. The image matching process 106 effectively creates a histogram which depicts the number of pixels of the camera image 102 which are representative of each of the predetermined gray levels. The image correlation module also includes means for dividing the predetermined gray levels into a number of bins of the histogram. Each bin includes a contiguous range of gray levels. For example, the means for dividing the gray levels into bins can initially divide the gray levels according to a predetermined allocation technique, such as allocating an equal number of gray levels to each bin or allocating predefined ranges of gray levels to the respective bins. The image correlation module can also include means for determining, for each of the bins, an actual count of the number of pixels which are representative of gray levels within the range of gray levels included within the respective bin.

The image correlation module includes means for correlating the pixel value probabilities for the selected tile to the pixel value probabilities for a reference image corresponding to the predicted position of the vehicle. The correlation process essentially overlays the selected tile onto the reference image and scans the tile over the reference image on a pixel-by-pixel basis, correlating the pixel value probabilities at each offset position of the tile. A correlation score is calculated repeatedly as the tile is scanned across the reference image with an offset that increases incrementally one pixel at a time.

In accordance with one proposed implementation, the image correlation module includes means for determining the total number of pixels $N_T$ which form the tile. Thus, for a rectangular tile formed of 512×512 pixels, the total number of pixels $N_T$ will be 262,144. In addition, the image correlation module includes means for determining the number of pixels $N_i$ which occupy the i-th bin in a one-dimensional histogram representing the distribution of pixel values in the selected tile and means for determining the number of pixels $N_j$ which occupy the j-th bin in a one-dimensional histogram representing the distribution of pixel values in the reference sub-image which is being presently compared to the selected tile. The image correlation module further includes means for determining the number of pixels $N_{i,j}$ in the one-dimensional histogram of the tile which have gray level values corresponding to the one-dimensional histogram of the reference sub-image. This is accomplished by calculating a cross two-dimensional histogram of the selected tile and the reference sub-image.

The image correlation module also includes means for calculating the correlation score between the selected tile and each offset reference sub-image. In particular, the image correlation module determines the correlation score X according to the following equation:

$$X = \sum_i \sum_j N_{i,j} \ln\left[\frac{N_{i,j}/N_i}{N_j/N_T}\right] = \sum_i \sum_j N_{i,j} \ln\left[\frac{N_{i,j}N_T}{N_i N_j}\right]$$

The correlation score X effectively measures the correlation or match between the tile and any portion of the reference image to which the tile is being compared. Thus, greater values of correlation score X indicate a greater correlation or match between the tile and the reference sub-image and, consequently, a higher likelihood that the reference sub-image corresponding to the selected tile from the camera image has been located within the reference image.

According to one embodiment, the image correlation module includes means for creating a plurality of relative offsets between the tile selected from the camera image 102 and the reference image 108. Thus, the selected tile can be compared to respective reference sub-images at each of the relative offsets, thereby enabling the tile to be "scanned" over the reference image incrementally. Consequently, the image correlation module can determine the correlation score X between the tile and the reference image 108 at each relative offset. As will be apparent to those skilled in the art, the tile may correlate or match the reference image 108 much better at one or more relative offsets than others. The image correlation module therefore also includes means for determining the relative offset between the tile and the reference image which provides the highest correlation score.

Figure 2:
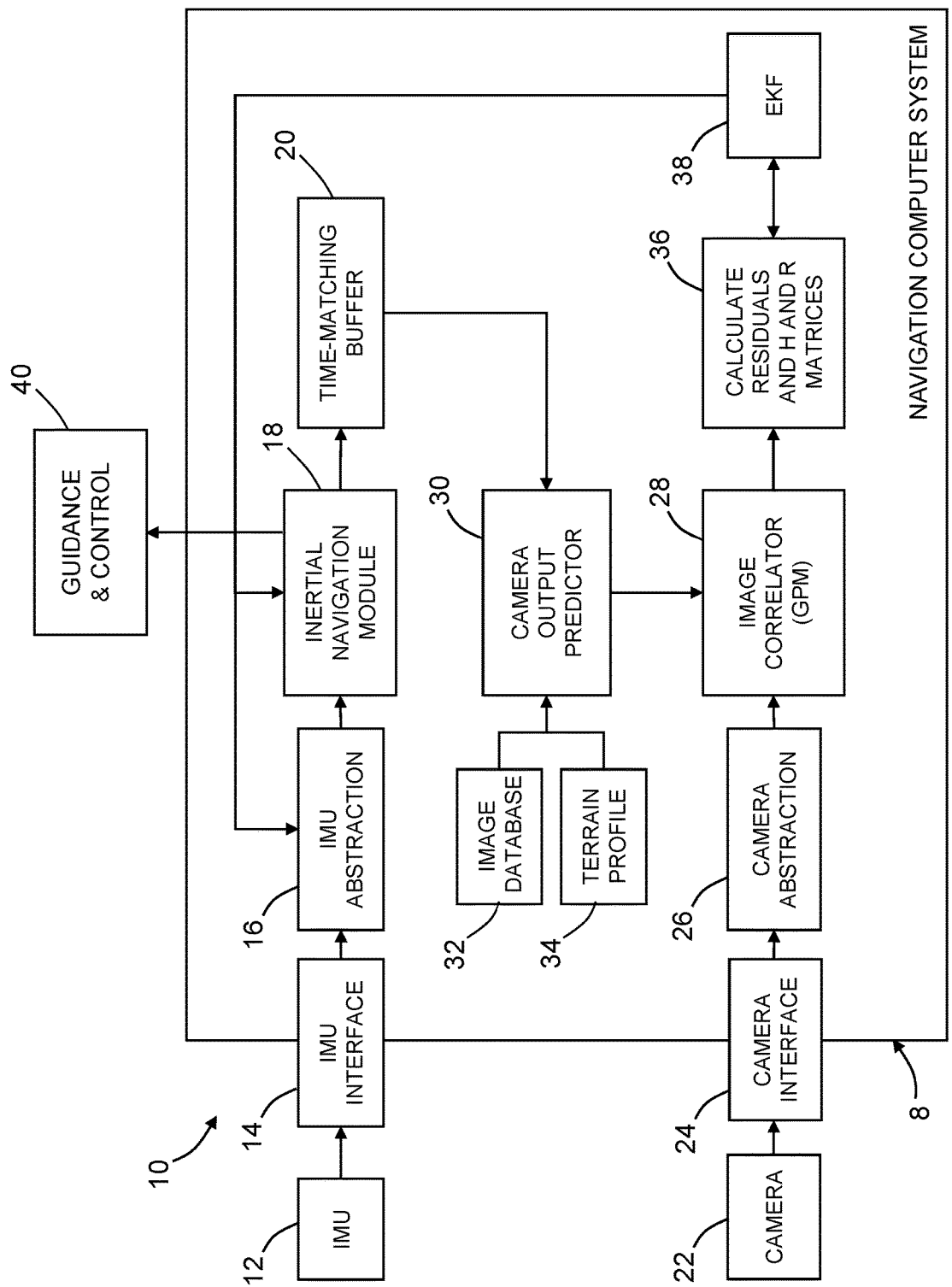
FIG. 2 is a diagram representing architecture for a system that uses image-based navigation to augment inertial navigation in accordance with an exemplary embodiment.

FIG. 2 is a diagram representing architecture for a navigation system 10 that uses image-based navigation to augment inertial navigation in accordance with an exemplary embodiment. Navigation system 10 is configured to determine a position of a vehicle (e.g., an aircraft) in a frame of reference of Earth, such as the ECEF frame of reference. Navigation system 10 includes a navigation computer system 8, an inertial measurement unit (IMU) 12 and a camera 22 (or other image sensor). The navigation computer system 8 is in electronic communication with the IMU 12 by way of an IMU interface 14 and is in electronic communication with the camera 22 by way of a camera interface 24.

The navigation computer system 8 includes one or more devices selected from microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in a non-transitory tangible computer-readable storage medium. Memory includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. Moreover, the navigation computer system 8 includes software modules that have code executable by respective processors for carrying out the functions and processes, as described herein. In the example depicted in FIG. 2, the navigation computer system 8 also includes an IMU abstraction module 16, an inertial navigation module 18, a time-matching buffer module 20, a camera abstraction module 26, an image correlation module 28, a camera output predictor 30, a reference image database 32, a terrain profile database 34, a residual and matrix calculation module 36 and an extended Kalman filtering module 38. In one proposed implementation, the image correlation module 28 includes respective software modules for performing the tile selection process 104, image matching process 106 and camera location estimation process 108 previously described with reference to FIG. 1.

The IMU 12 includes a plurality of sensors for measuring the acceleration (three accelerometers) and rotation rate (three gyroscopes) of the aircraft. The IMU abstraction module 16 processes and encodes the signals output by the sensors of IMU 12 to form digital data representing measurements of the rotation rate (or delta angle) and acceleration (or delta velocity) of the vehicle. That rotation and acceleration data is processed by the inertial navigation module 18. The inertial navigation module 18 includes executable code to integrate the rotation rate of the vehicle into the attitude of the vehicle with consideration of the Earth's rotation. The vehicle attitude is then used to project vehicle acceleration onto the ECEF frame of reference. Accordingly, total vehicle acceleration, including gravity, due to Earth rotation can be calculated. Vehicle acceleration is then integrated into the velocity of the vehicle and vehicle velocity is integrated to determine the position of the vehicle in the ECEF frame of reference.

A time-matching buffer module 20 includes executable code to store the position, velocity, attitude of the vehicle into a first-in first-out buffer or a circular buffer with a time tag. The time-matching buffer module 20 provides the time-matched position, velocity, and attitude of the vehicle when a time tag of the image-based measurements is provided. The time-matched position, velocity and attitude of the vehicle are provided to the camera output predictor 30.

The camera output predictor 30 is a processor configured with software that processes the vehicle position/attitude data received from the time-matching buffer 20 and the current estimate of the camera misalignments, and retrieves a reference image from the reference image database 32 and a corresponding terrain profile from the terrain profile database 34. The terrain profile database stores digital data representing the elevation relative to sea level of the Earth's surface in areas of interest. The retrieved reference image represents a predicted scene having known coordinates in the ECEF frame of reference. That predicted scene in turn is based on the predicted position of the vehicle as determined by the inertial navigation module 18, the orientation of the camera 22 relative to the body of the vehicle, and the terrain profile for the portion of the Earth's surface visible in the predicted scene. As explained in some detail below, this reference image will be compared to the current camera image to determine a position error that can be used to correct the navigation solution output by the inertial navigation module 18.

While the IMU 12 is measuring the acceleration and rotation rate of the vehicle, a camera 22 onboard the vehicle captures images of the portion of the Earth's surface within the camera's field-of-view. In one proposed implementation, the camera 22 includes a two-dimensional array of photodetectors. The system further includes a camera abstraction module 26 that processes and encodes the signals output by the photodetectors in camera 22 to form digital data representing quantized levels for detected light intensity (hereinafter "pixel values"). The camera abstraction module 26 is a software interface module that runs on the computer that receives information from the camera. The software interface is typically customized to suit each type of camera and provides the image and time-tag which are expected by the rest of the system software, independent of specific camera types.

The pixel values output by the camera abstraction module 26 are received by the image correlation module 28. The image correlation module 28 includes executable code for classifying the pixel values in bins of a histogram and computing the probabilities of the pixel values in the camera image being processed for the purpose of selecting feature-rich tiles. In addition, the image correlation module 28 includes executable code for searching respective histograms (based on pixel-wise offsets) of a scanned reference image for a histogram that best matches the histogram of each selected tile using an image correlation process that includes image matching.

More specifically, image correlation process includes the following steps: (1) Pictures are divided into regions, typical two to four regions, for the purpose of attaining "geometric diversity". (2) Each region is divided into tiles for the purposes of: (a) allowing the system to not use the "information-poor" tiles (first quality control point); (b) reducing computation; and (c) correction results can be checked individually and retained or discarded (second quality control point). (3) The results from useful tiles are combined to form the correlation results for the "region", which is again checked for quality. (4) The "LOS" vector derived from each region which passed the quality control checks are sent to a Kalman filter. (5) The Kalman filter checks the "reasonableness" of the residual calculated, performing a third validation, and then finally uses valid residuals to generate corrections.

As previously described, portions of each image captured by the camera 22 (hereinafter "camera image") are extracted to form respective tiles. The tiles are chosen to be small enough to minimize the impact of rotation and to have reasonable throughput demand. The tiles are chosen to be large enough to contain sufficient "features" to allow proper correlation. As used herein, a feature is defined as a part of an image of interest. Examples of features in a camera image include edges and corners. An edge comprises points along a boundary between two image regions. In general, an edge can be of almost arbitrary shape. In practice, edges are usually defined as sets of points in the image which have a strong gradient magnitude and a local one-dimensional structure. Corners are point-like features (e.g., points of interest) in an image which have a local two-dimensional structure.

In accordance with the method for image-based navigation proposed herein, a camera sub-image of a region is partitioned into a multiplicity of tiles by the image correlation module 28, but not all tiles are used. Proper choice of tiles reduces throughput need and improves performance. In accordance with one embodiment, the image correlation module 28 selects tiles based on two criteria: (1) the tile is rich in features; and (2) the expected correlation results are satisfactory. In one proposed implementation, one-dimensional entropy is used as a criterion for determining which tiles should be selected for use in navigation. "Bad" tiles (such as those formed from a portion of an image of a featureless body of water) are not used, which helps to improve performance of the navigation system.

The histogram of each selected tile is subsequently correlated with respective histograms of respective portions (sub-images) of a reference image. As previously described, an image matching process is used to find the reference sub-image that best matches the selected tile.

In accordance with one embodiment, the image correlation module 28 is communicatively coupled to receive the camera image data and the reference image data. The image correlation module 28 is configured to partition the camera image data into respective sets of camera sub-image data corresponding to respective regions in an area within a field-of-view of the camera, partition each set of the camera sub-image data into respective sets of tile data corresponding to respective sub-regions in a respective region and then generate correlation results representing degrees of correlation between the respective sets of tile data and the reference image data.

The navigation computer system 8 further includes a residual and matrix calculation module 36 communicatively coupled to receive the correlation results from the image correlation module 28. The residual and matrix calculation module 36 includes executable code for calculating respective lines-of-sight for each region based on the correlation results and then calculating residuals and the H- and R-matrices.

The navigation computer system 8 also includes an extended Kalman filter module 38 communicatively coupled to the residual and matrix calculation module 36 to receive data representing the residuals and H- and R-matrices for respective regions in an imaged area. The extended Kalman filter module 38 is configured to generate position, velocity and attitude corrections based on the received residuals and matrices. In addition, the extended Kalman filter module 38 estimates IMU corrections, such as bias, scale factor, misalignment corrections, which are sent to and applied by the IMU abstraction module 16. The EKF-estimated position, velocity and attitude errors are sent to and applied by the inertial navigation module 18 to generate a navigation solution. In one proposed application, the navigation solution is sent to the guidance and control system 40, which is configured to control movement of the vehicle based at least in part on the navigation solution received.

Figure 3A:
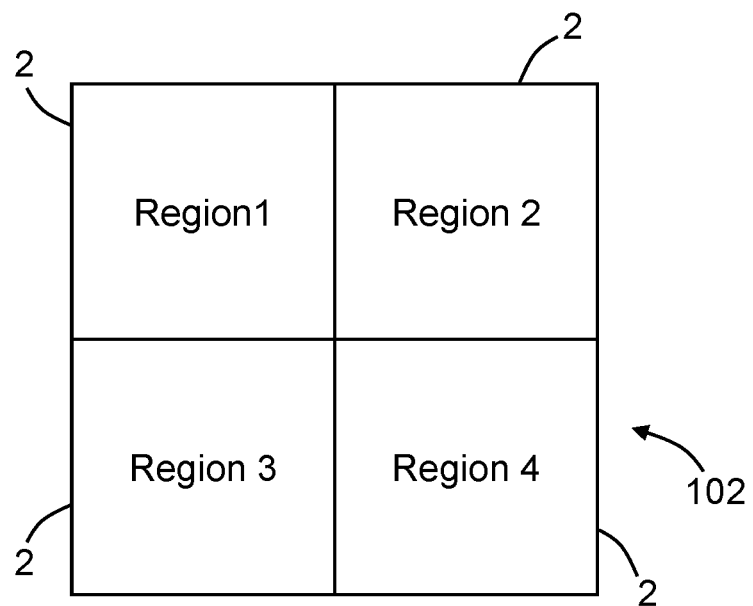
FIG. 3A is a diagram representing the partition of a camera image into four camera sub-images.

As previously mentioned, the image correlation module 28 is configured to partition the camera image 102 into a multiplicity of tiles representing the topography within respective sub-regions in an area within the field-of-view of the camera 22. In accordance some embodiments, each camera image 102 is partitioned into a plurality of camera sub-images representing the topography within respective regions in the area within the field-of-view of the camera 22. Then each camera sub-image is partitioned into a multiplicity of tiles representing the topography within sub-regions. For example, as depicted in FIG. 3A, each camera image 102 (which is an image of the area within the field-of-view of the camera) is partitioned into four camera sub-images 2 (which are images of respective regions within the aforementioned area). In this example, the four regions correspond to respective contiguous quarters of a rectangular area within the field-of-view of the camera 22. Processing of the four camera sub-images separately takes advantage of any geometric diversity of the topography within the respective regions.

Figure 3B:
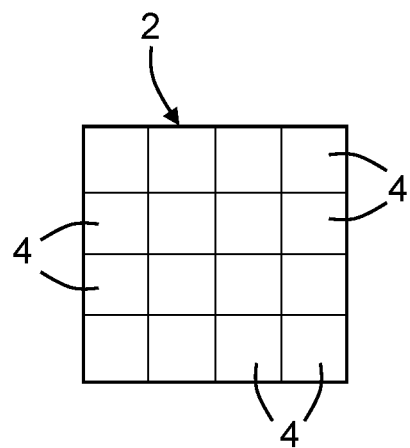
FIG. 3B is a diagram representing the partition of a camera sub-image into sixteen tiles (camera sub-images).

To reduce the computational load and to also perform quality control, each camera sub-image 2 is further divided into sixteen tiles 4 (see FIG. 3B). The tiles 4 of the four camera sub-images 2 are processed separately by the image correlation module 28 to derive a respective single line-of-sight (LOS) measurement to a respective point in each region. Each tile 4 of a given camera sub-image 2 is correlated with the reference image 108 as previously described. Only feature-rich tiles which satisfy the previously discussed criteria are selected and processed further; the tile data for information-poor tiles is discarded. The resulting correlation results for the selected tiles are used to construct a two-dimensional correlation results matrix. The correlation results matrices for all selected tiles in a particular camera sub-image are then averaged to generate an average results matrix.

In accordance with one proposed implementation, the respective centers of the tiles selected from a camera sub-image are used to compute an average line-of-sight measurement (average LOS) to a point in that region. Each region produces a separate LOS measurement. In the event that all tiles in a camera sub-image are selected, then the LOS vector directed at the center of (or other point in) the region corresponding to that camera sub-image can be used. If some tiles are rejected, then the LOS vector for the region may be a weighted average of the LOS vectors directed at points in respective geographic areas corresponding to the selected tiles.

The LOS measurements for the four camera sub-images 2 are used by the extended Kalman filter module 38 to provide updates to the navigation states. More specifically, the extended Kalman filter module 38 derives an LOS error from the LOS measurements for each region.

Figure 4:
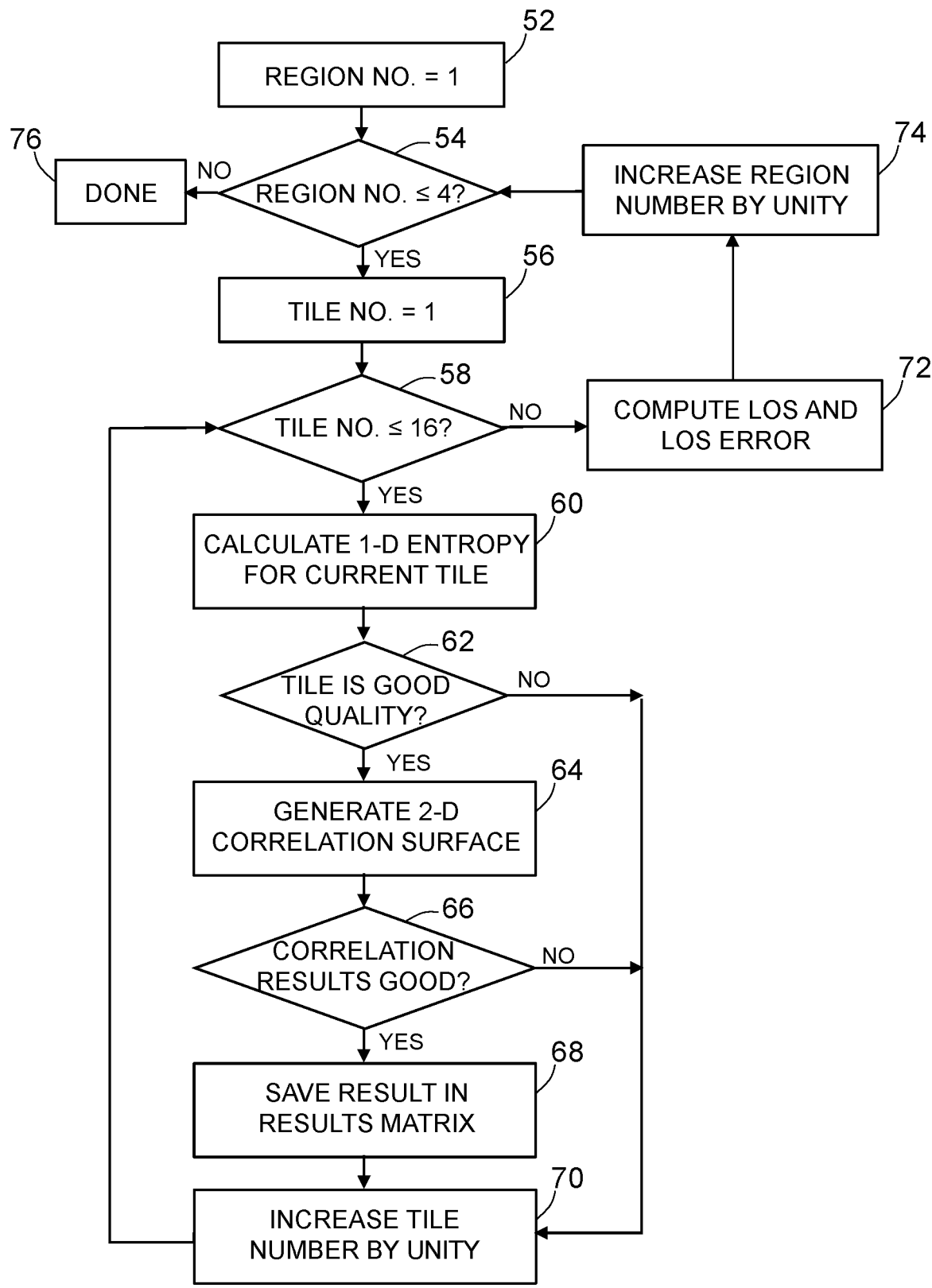
FIG. 4 is a flowchart identifying steps of a method for deriving line-of-sight measurements in accordance with one embodiment.

FIG. 4 is a flowchart identifying steps of a method 50 for deriving line-of-sight measurements in accordance with one exemplary implementation in which each camera image is partitioned into four camera sub-images 2 as shown in FIG. 3A and each camera sub-image 2 is divided into sixteen tiles 4 as shown in FIG. 3B. The method 50 loops around all the "regions" (four regions in the example depicted). In each of the loops, the method 50 will further loop around each of the tiles in the region (sixteen tiles in the example depicted).

In an exemplary sequence of operations, the camera sub-image data for Region #1 is retrieved first (step 52). The image correlation module 28 is configured to make a determination whether the number of the region whose image data is being processed is less than or equal to four (step 54). If a determination is made in step 54 that the number of the region is not less than or equal to four, then the process is terminated. If a determination is made in step 54 that the number of the region is less than or equal to four, then the image data for Tile #1 for Region #1 is retrieved (step 56). The image correlation module 28 is further configured to make a determination whether the number of the tile being processed is less than or equal to 16 (step 58).

If a determination is made in step 58 that the number of the tile being processed is less than or equal to 16, then the image correlation module 28 calculates a one-dimensional entropy using the probabilities of the pixel values in the tile (step 60). Next the image correlation module 28 determines whether the tile 4 being processed is "good quality" or not (step 62). The quality is "good" if the tile data is sufficiently rich in features. This is determined by comparing the entropy to a specified threshold. On the one hand, if a determination is made in step 62 that the tile being processed is not good quality, then the image correlation module 28 discards that tile data, increases the tile number by one and retrieves the tile data for the next tile to be processed (step 70). The process then returns to step 58 for the next iteration.

On the other hand, if a determination is made in step 62 that the tile being processed is good quality, then the image correlation module 28 performs a two-dimensional search by scanning the tile over the reference image and correlating the two sets of image data at every offset position of the tile, thereby generating a three-dimensional correlation surface (step 64). The height (z-coordinate) of the correlation surface increases with the increasing degree of correlation (e.g., increasing correlation score), so that the offset coordinates of peaks in the correlation surface indicate the offset position relative to the reference image that produces a best match of the tile data and reference image data.

Next the image correlation module 28 determines whether the correlation results for the tile being processed are "good" or not (step 66). The correlation results are "good" if the distance separating the two highest peaks in the correlation surface is greater than a specified separation distance. On the one hand, if a determination is made in step 66 that the correlation results are not good, then the image correlation module 28 discards that tile data, increases the tile number by unity and retrieves the tile data for the next tile to be processed (step 70). The process then returns to step 58 for the next iteration.

On the other hand, if a determination is made in step 66 that the correlation results are good, then the image correlation module 28 saves the correlation results in a results matrix in a non-transitory tangible computer-readable storage medium (step 68). Then the image correlation module 28 increases the tile number by unity and retrieves the tile data for the next tile to be processed (step 70). The process then returns to step 58 for the next iteration.

If a determination is made in step 58 that the number of the tile being processed is not less than or equal to sixteen, then the image data for Tile #1 of the next camera sub-image (corresponding to the next region of the area in the field-of-view of the camera at the time of image capture) is retrieved. Each tile in the camera sub-image corresponding to Region #2 is processed in the manner described above. This process is repeated for Region #3 and Region #4 as well. After completion of tile processing for each region, the LOS and LOS error for that region are calculated (step 72). Then the number of the region is increased by one (step 74). If a determination is made in step 54 that the number of the region whose camera sub-image is being processed is greater than four, then the process is terminated (step 76).

Thus, the result of the methodology depicted in FIG. 4 is that only feature-rich tiles are selected for further processing. The tile image data for non-selected tiles is not used. The first and second highest peaks in the correlation surface are compared. If the first and second highest peaks are "well separated", then the result is accepted as "good results" and will be used to support navigation. Otherwise the correlation results are rejected as "bad quality".

The proposed method is looking for the best tiles to select prior to applying image matching. The best tiles are selected based on the entropy of each tile. In information theory, entropy is the average rate at which information is produced by a stochastic source of data. Qualitatively, entropy is a measure of uncertainty—the higher the entropy, the more uncertain one is about a random variable. The measure of information entropy associated with each possible data value i is the negative logarithm of the probability mass function for the value i:

$$\sum_i p(i) \log_2 p(i)$$

where p(i) is the probability of pixel value i from the camera image, i varies from 0 to L−1, and L is the number of different pixel values (that is, the number of bins in the histogram).

The tiles with higher entropy contain more details (e.g., edges). The tiles with lower entropy have more redundant information (e.g., background). As a result, the proposed method selects the tiles with higher amounts of information. An entropy threshold is defined. Only tiles having entropy greater than the entropy threshold are selected. In an alternative proposed implementation, a number of tiles having the highest entropies may be selected.

A determination is made whether the entropy for the tile being processed is greater than the estimated threshold or not. On the one hand, if a determination is made that the entropy is not greater than the threshold, then the tile image data for that tile is disregarded. The process then selects the next tile for processing. On the other hand, if a determination is made that the entropy is greater than the threshold, then the tile is selected for image matching, meaning that the pixel value probabilities for the selected tile are retrieved from a non-transitory tangible computer-readable storage medium. The following formula for computing mutual information is then used to generate correlation results:

$$\sum_j \sum_i p(j, i) \cdot \log_2 \frac{p(j, i)}{p(j)p(i)}$$

where p(i) are the pixel value probabilities for the tile; p(j) are the pixel value probabilities for the scanned portion of the reference image 108; and p(j, i) is the joint probability distribution. The highest score determines the offset location of the tile that best matches the reference image 108.

Figure 5:
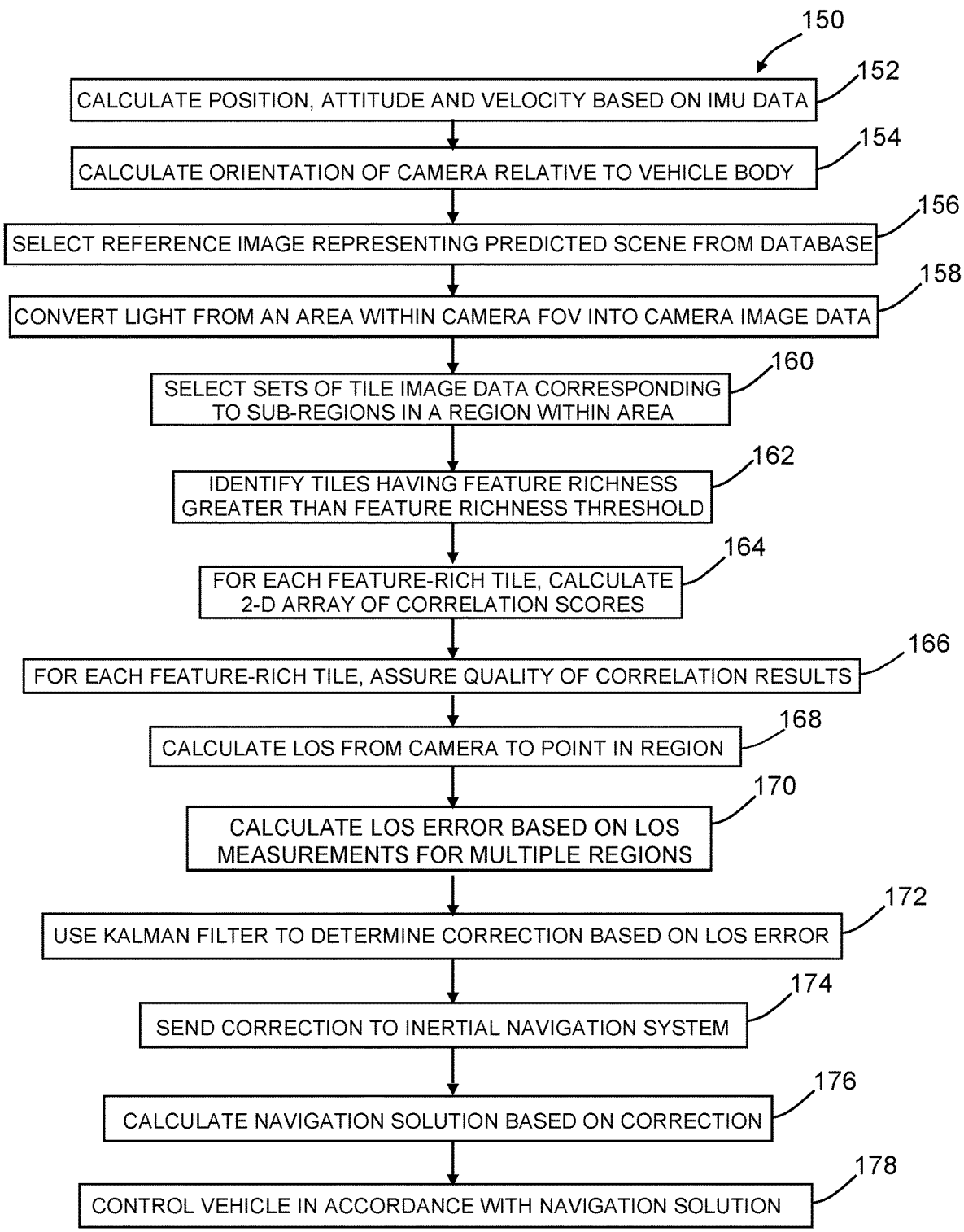
FIG. 5 is a flowchart identifying steps of a method for controlling a vehicle using vision-aided inertial navigation in accordance with one embodiment.

FIG. 5 is a flowchart identifying steps of a method 150 for controlling a vehicle using vision-aided inertial navigation in accordance with one application. A position, an attitude and a velocity of the vehicle are calculated based on inertial measurement data acquired by an inertial navigation system (step 152). In addition, an orientation of a camera relative to the body of the vehicle is calculated (step 154). Then a reference image is selected from a reference image database based on calculation results of steps 152 and 154, which reference image represents a predicted scene of a portion of the Earth's surface having known geographic coordinates (step 156). During operation of the camera, light from an area on a surface of Earth within a field-of-view of the camera is converted into camera image data representing pixel values of an image of the area (step 158). A multiplicity of sets of tile data are selected from the camera image data, which sets of tile data represent pixel values of a multiplicity of tiles respectively corresponding to a multiplicity of sub-regions in a region in the area that was within the field-of-view of the camera (step 160). Using the tile selection process described above, feature-rich tiles that have tile data evidencing a feature richness greater than a feature richness threshold are identified (step 162). For each feature-rich tile identified in step 162, a respective two-dimensional array of correlation scores are calculated, which correlation scores are indicative of degrees of correlation of the tile data with respective subsets of reference image data representing pixel values of the reference image when the tile data has respective offsets relative to the reference image data (step 164). In addition, for each feature-rich tile identified in step 162, a quality of the correlation results is assured by testing whether the correlation scores are greater than a quality assurance threshold (step 166). After all tiles in a camera sub-image of the camera image have been processed, a line-of-sight from the camera to a point in the region corresponding to that camera sub-image is calculated based at least in part on the lines-of-sight to respective points in respective sub-regions corresponding to the feature-rich tiles whose correlation results had assured quality (step 168). This process is repeated for each region in the area that was within the camera field-of-view. A line-of-sight error is then calculated based on the lines-of-sight calculated in step 168 for each region of a plurality of regions within the area of interest (step 170). The LOS error is then used by the extended Kalman filter module 38 to calculate a position correction and other corrections (step 172). The corrections are sent to the inertial navigation system (step 174). The inertial navigation system calculates a navigation solution (step 176) based on at least the position correction calculated in step 174. Then the guidance and control system controls the vehicle to fly in accordance with the navigation solution (step 178).

In accordance with alternative embodiments, the vehicle may be equipped with multiple cameras which concurrently capture images from different directions. The processing of the camera output for each of the cameras will be identical to the above-described processing for a single camera and the Kalman filter will naturally mix the corrections generated by the camera data with proper weights automatically. Specifically, the Kalman filter is configured to include camera misalignment states for each of the multiple cameras. The data acquired by each camera will be processed in the same way to correlate with the predicted image using current vehicle position, attitude and camera misalignment data. The correlation of the images and the way the measurements are used by the Kalman filters are the same. In accordance with the present disclosure, the extended Kalman filter module 38 (see FIG. 2) contains the following states: (a) inertial navigation states: vehicle position error, vehicle velocity error and vehicle attitude error (nine states); (b) IMU error parameter states: there could be many IMU error parameters states. For example, for a six-state model there are three gyroscope bias states and three accelerometer bias states. However, for a twenty-one-state model there are three gyroscope bias states, three gyroscope scale factor states, three gyroscope rotational misalignment states, three gyroscope non-orthogonality error states, three accelerometer bias states, three accelerometer scale factor states, and three accelerometer non-orthogonality error states. Scale factor asymmetry states and G sensitivity states may also be included. IMU error parameters states are each modeled as a random walk or a first-order Markov process.

The residuals and H-matrix determined in the residual and matrix calculation module 36 will now be described. The residuals used by the extended Kalman filter module 38 are calculated as the difference between the actual measurement derived from the camera and the predicted measurement using the current estimate of states. First, let the location of the vehicle/camera in the ECEF frame of reference be $^E r$ and the position vector for reference point j in the ECEF frame of reference be $^E r_j$. (In the embodiment disclosed herein, the reference points on the ground are the image centers of multiple tiles in a camera image of a portion of the Earth's surface, as will be explained in more detail below.) The line-of-sight (LOS) unit vector from the vehicle to the reference point j can be calculated as:

$$^E u_j = \frac{1}{\|^E r_j - ^E r\|}(^E r_j - ^E r) = \frac{1}{\rho_j}(^E r_j - ^E r) \qquad (1)$$

where $\rho_j = \|^E r_j - ^E r\|$ is the range to the reference point j. $^E u_j$ is transformed to the camera frame of reference using Eq. (2):

$$^c u_j = C_B^C C_E^B {}^E u_j \qquad (2)$$

where $C_B^C$ is the directional cosine matrix (DCM) from the vehicle (body) frame of reference to the camera frame of reference and represents camera orientation; and where $C_E^B$ is the DCM from the ECEF frame of reference to the vehicle (body) frame of reference and represents vehicle attitude. (A direction cosine matrix is a transformation matrix that transforms one coordinate reference frame to another.) To predict reference point position in the field-of-view (FOV) of the camera 22, the unit vector Cu in the camera frame of reference can be used to calculate the h and v coordinates of the reference point in the camera FOV, where h is the predicted horizontal coordinate of the reference point in the FOV and v is the predicted vertical coordinate of the reference point in the FOV. The predicted horizontal coordinate h of the reference point j in the FOV is calculated according to Eq. (3):

$$h_j = \frac{{}^c u_j(1)}{{}^c u_j(3)} \qquad (3)$$

The predicted vertical coordinate v of the reference point j in the FOV is calculated according to Eq. (4):

$$v_j = \frac{{}^c u_j(2)}{{}^c u_j(3)} \qquad (4)$$

Accordingly, the Kalman filter residuals are described by Eqs. (5) and (6):

$$\Delta h_j = mh_j - h_j \qquad (5)$$

$$\Delta v_j = mv_j - v_j \qquad (6)$$

where $mh_j$ and $mv_j$ are the measured horizontal and vertical coordinates of reference point j in the camera FOV. The H sub-matrices for camera misalignment, vehicle (body) attitude, vehicle (body) position, and reference position error used in the extended Kalman filter module 38 are as follows.

The H sub-matrix for camera frame misalignment (cma) error is expressed as Eq. (7)

$$H_{cma} = \frac{1}{{}^c u(3)} \begin{bmatrix} 1 & 0 & -h \\ 0 & 1 & -v \end{bmatrix} [{}^c \overline{u}_j \times] \qquad (7)$$

$$= \frac{1}{{}^c u(3)} \begin{bmatrix} 1 & 0 & -h \\ 0 & 1 & -v \end{bmatrix} \begin{bmatrix} 0 & -{}^c u_j(3) & {}^c u_j(2) \\ {}^c u_j(3) & 0 & -{}^c u_j(1) \\ -{}^c u_j(2) & {}^c u_j(1) & 0 \end{bmatrix}$$

$$= \begin{bmatrix} 1 & 0 & -h \\ 0 & 1 & -v \end{bmatrix} \begin{bmatrix} 0 & -1 & v \\ 1 & 0 & -h \\ -v & h & 0 \end{bmatrix} = \begin{bmatrix} hv & -(1+h^2) & v \\ 1+v^2 & -hv & -h \end{bmatrix}$$

The H sub-matrix for vehicle attitude error is expressed as Eq. (8):

$$H_{att} = \frac{-1}{{}^c u(3)} \begin{bmatrix} 1 & 0 & -h \\ 0 & 1 & -v \end{bmatrix} [{}^c \overline{u}_j \times] \hat{C}_E^C = -\begin{bmatrix} hv & -(1+h^2) & v \\ 1+v^2 & -hv & -h \end{bmatrix} \hat{C}_E^C \qquad (8)$$

The H sub-matrix for vehicle position error is expressed as Eq. (9):

$$H_{pos} = \frac{-1}{{}^c u(3)} \begin{bmatrix} 1 & 0 & -h \\ 0 & 1 & -v \end{bmatrix} \frac{1}{\hat{\rho}} \hat{C}_B^C \hat{C}_E^B = \frac{-1}{\hat{\rho}\sqrt{1+h^2+v^2}} \begin{bmatrix} 1 & 0 & -h \\ 0 & 1 & -v \end{bmatrix} \hat{C}_E^C \qquad (9)$$

where $\hat{\rho}$ is the range to the reference point j: $\rho_j = \|{}^E r_j - {}^E r\|$ and $\hat{C}_E^C$ is the direction cosine matrix from the ECEF frame to the camera frame.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for providing improved navigation performance have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor, processing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device".

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for navigating a vehicle comprising:
   (a) converting light from an area within a field-of-view of a camera into camera image data representing pixel values of an image of the area;
   (b) partitioning the camera image data into a plurality of sets of camera sub-image data respectively representing pixel values of images of respective regions in the area;
   (c) partitioning a first set of camera sub-image data of the plurality of sets of camera sub-image data into a first multiplicity of sets of tile data representing pixel values of a first multiplicity of tiles respectively corresponding to a first multiplicity of sub-regions in a first region of the area;
   (d) identifying feature-rich tiles of the first multiplicity of tiles that have tile data evidencing a feature richness greater than a feature richness threshold;
   (e) for each feature-rich tile identified in step (d), calculating a respective two-dimensional array of correlation results indicative of degrees of correlation of the tile data with respective subsets of reference image data when the tile data has respective offsets, wherein the reference image data represents pixel values of a reference image representing a predicted scene;
(f) for each feature-rich tile identified in step (d), assuring that a quality of the correlation results is greater than a quality assurance threshold;
(g) calculating a first line-of-sight from the camera to a point in the first region by averaging lines-of-sight to respective points in the respective sub-regions corresponding to feature-rich tiles which were quality assured in step (f);
(h) calculating a position correction for the vehicle based at least in part on the first line-of-sight for the first region calculated in step (g); and
(i) determining a navigation solution which is based on at least the position correction calculated in step (h).

2. The method as recited in claim 1, wherein the feature richness threshold is a threshold entropy value and step (d) comprises:
calculating a respective entropy value for each tile of the first multiplicity of tiles; and
comparing the respective entropy values to the threshold entropy value.

3. The method as recited in claim 2, wherein step (f) comprises assuring that a distance separating first and second peaks in the correlation results is greater than a specified separation distance.

4. The method as recited in claim 1, further comprising:
(j) calculating a position, an attitude and a velocity of the vehicle based on inertial measurement data acquired by an inertial navigation system;
(k) calculating an orientation of the camera relative to the body of the vehicle; and
(l) selecting the reference image from a reference image database based on calculation results of steps (j) and (k).

5. The method as recited in claim 4, wherein the position correction is calculated using a Kalman filter and then sent to the inertial navigation system.

6. The method as recited in claim 5, further comprising:
(j) partitioning a second set of camera sub-image data of the plurality of sets of camera sub-image data into a second multiplicity of sets of tile data representing pixel values of a second multiplicity of tiles respectively corresponding to a second multiplicity of sub-regions in a second region of the area;
(k) identifying feature-rich tiles of the second multiplicity of tiles that have tile data evidencing a feature richness greater than the feature richness threshold;
(l) for each feature-rich tile identified in step (k), calculating a respective two-dimensional array of correlation results indicative of degrees of correlation of the tile data with respective subsets of reference image data when the tile data has respective offsets relative to the reference image data;
(m) for each feature-rich tile identified in step (k), assuring that a quality of the correlation results is greater than the quality assurance threshold; and
(n) calculating a second line-of-sight from the camera to a point in the second region based at least in part on lines-of-sight to respective points in the respective sub-regions corresponding to the feature-rich tiles which were quality assured in step (m),
wherein step (h) comprises calculating the position correction based on at least the first and second lines-of-sight calculated in steps (g) and (n).

7. The method as recited in claim 6, wherein step (h) comprises calculating the position correction based at least on an average of a plurality of lines-of-sight that includes at least the first and second lines-of-sight.

8. A method for navigating a vehicle comprising:
(a) calculating a position, an attitude and a velocity of the vehicle based on inertial measurement data acquired by an inertial navigation system;
(b) calculating an orientation of a camera relative to the body of the vehicle;
(c) selecting a reference image representing a predicted scene from a reference image database based on calculation results of steps (a) and (b);
(d) converting light from an area within a field-of-view of the camera into camera image data representing pixel values of an image of the area;
(e) selecting from the camera image data a multiplicity of sets of tile data representing pixel values of a multiplicity of tiles respectively corresponding to a multiplicity of sub-regions in a region within the area;
(f) identifying feature-rich tiles of the multiplicity of tiles that have tile data evidencing a feature richness greater than a feature richness threshold;
(g) for each feature-rich tile identified in step (f), calculating a respective two-dimensional array of correlation results indicative of degrees of correlation of the tile data with respective subsets of reference image data representing pixel values of the reference image when the tile data has respective offsets relative to the reference image data;
(h) calculating a line-of-sight from the camera to a point in the region based on the correlation results calculated in step (g);
(i) calculating a position correction for the vehicle based on at least the line-of-sight calculated in step (h);
(j) sending the position correction to the inertial navigation system; and
(k) calculating a navigation solution based on at least the position correction calculated in step (i).

9. The method as recited in claim 8, wherein the feature richness threshold is a threshold entropy value and step (f) comprises:
calculating a respective entropy value for each tile of the first multiplicity of tiles; and
comparing the respective entropy values to the threshold entropy value.

10. The method as recited in claim 8, further comprising assuring that a quality of the correlation results is greater than a quality assurance threshold for each feature-rich tile identified in step (f).

11. The method as recited in claim 10, wherein the quality assurance threshold is a threshold distance separating first and second peaks in the correlation results.

12. The method as recited in claim 8, further comprising performing steps (e) through (h) for each region of a plurality of regions within the area, wherein the position correction is calculated based on an average of a plurality of lines-of-sight respectively calculated for the plurality of regions.

13. The method as recited in claim 12, wherein the plurality of regions includes four regions corresponding to respective quarters of the area.

14. The method as recited in claim 12, wherein the position correction is calculated using a Kalman filter and then sent to the inertial navigation system.

15. A system for navigating a vehicle comprising:
an inertial navigation system configured to generate a navigation solution;

a guidance and control system communicatively coupled to the inertial navigation system and configured to control the vehicle in accordance with the navigation solution;

a time-matching buffer communicatively coupled to the inertial navigation system and configured to store data representing position, velocity and attitude of the vehicle with a time-tag;

a camera system comprising a camera and a camera abstraction module configured to convert light from an area within a field-of-view of the camera into camera image data representing pixel values of an image of the area;

a camera output predictor communicatively coupled to receive time-tagged position, velocity, and attitude of the vehicle from the time-matching buffer and retrieve reference image data representing pixel values of an image of a predicted scene from a reference image database;

an image correlation module communicatively coupled to receive the camera image data and the reference image data and configured to partition the camera image data into respective sets of camera sub-image data corresponding to respective regions in an area within a field-of-view of the camera, partition each set of the camera sub-image data into respective sets of tile data corresponding to respective sub-regions in a respective region and then generate correlation results representing degrees of correlation between the respective sets of tile data and the reference image data;

a line-of-sight calculation module communicatively coupled to receive the correlation results from the image correlation module and configured to calculate respective lines-of-sight for each region based on the correlation results; and a Kalman filter communicatively coupled to the line-of-sight calculation module to receive the calculated lines-of-sight for the regions and configured to generate a position correction based on the received lines-of-sight and then send the position correction to the inertial navigation system.

16. The system as recited in claim 15, wherein the image correlation module is further configured to perform operations comprising:

(a) selecting from the camera image data a multiplicity of sets of tile data representing pixel values of a multiplicity of tiles respectively corresponding to a multiplicity of tiles in each region within the area;

(b) identifying feature-rich tiles of the multiplicity of tiles that have tile data evidencing a feature richness greater than a feature richness threshold; and (c) for each feature-rich tile identified in operation (c), calculating a respective two-dimensional array of correlation results indicative of degrees of correlation of the tile data with respective subsets of reference image data representing pixel values of the reference image when the tile data has respective offsets relative to the reference image data.

17. The system as recited in claim 16, wherein the feature richness threshold is a threshold entropy value and operation (b) comprises:

calculating a respective entropy value for each tile of the first multiplicity of tiles; and comparing the respective entropy values to the threshold entropy value.

18. The system as recited in claim 16, wherein the image correlation module is further configured, for each feature-rich tile identified in operation (c), to assure that a quality of the correlation results for those feature-rich tiles is greater than a quality assurance threshold.

19. The system as recited in claim 18, wherein the line-of-sight calculation module is configured to calculate a respective line-of-sight from the camera to a respective point in each region based at least in part on the lines-of-sight to respective points in sub-regions imaged in the respective feature-rich tiles which were quality assured.

20. The system as recited in claim 18, wherein the quality assurance threshold is a threshold distance separating first and second peaks in the correlation results.

* * * * *